(12) United States Patent
Groth

(10) Patent No.: US 9,501,305 B2
(45) Date of Patent: Nov. 22, 2016

(54) SYSTEM FOR VIRTUALISATION MONITORING

(75) Inventor: Andreas Groth, Largs (GB)

(73) Assignee: Inernational Business Machines Corporation, Armonk, NY (US)

( * ) Notice: Subject to any disclaimer, the term of this patent is extended or adjusted under 35 U.S.C. 154(b) by 1716 days.

(21) Appl. No.: 12/420,276

(22) Filed: Apr. 8, 2009

(65) Prior Publication Data

US 2009/0271786 A1    Oct. 29, 2009

(30) Foreign Application Priority Data

Apr. 23, 2008 (EP) ..................... 08154987

(51) Int. Cl.
*G06F 9/40* (2006.01)
*G06F 9/455* (2006.01)
*G06F 9/50* (2006.01)
*G06F 11/32* (2006.01)

(52) U.S. Cl.
CPC ......... *G06F 9/45558* (2013.01); *G06F 9/5077* (2013.01); *G06F 11/327* (2013.01); *G06F 2009/45591* (2013.01)

(58) Field of Classification Search
CPC ..................... G06F 9/5088; G06F 2009/4557
USPC ............................................................ 718/1
See application file for complete search history.

(56) References Cited

U.S. PATENT DOCUMENTS

| | | | |
|---|---|---|---|
| 7,089,395 B2 | 8/2006 | Jacobson et al. | |
| 7,313,793 B2 * | 12/2007 | Traut et al. | ....................... 718/1 |
| 2005/0015685 A1 | 1/2005 | Yamamoto | |
| 2005/0081119 A1 | 4/2005 | DiZoglio et al. | |
| 2005/0108375 A1 | 5/2005 | Hallak-Stamler | |
| 2006/0005189 A1 * | 1/2006 | Vega et al. | ......................... 718/1 |
| 2006/0174087 A1 | 8/2006 | Hashimoto et al. | |
| 2007/0088810 A1 | 4/2007 | Lamb et al. | |
| 2007/0220376 A1 | 9/2007 | Furukawa | |
| 2009/0210527 A1 * | 8/2009 | Kawato | .......................... 709/224 |

FOREIGN PATENT DOCUMENTS

WO    2007021836    2/2007

OTHER PUBLICATIONS

Zacharski, Adam. "Xen and the Art of Distributed Virtual Machine Management". 25 pages, May 30, 2007.*

* cited by examiner

*Primary Examiner* — Corey S Faherty
(74) *Attorney, Agent, or Firm* — Lieberman & Brandsdorfer, LLC

(57) ABSTRACT

A system for virtualization monitoring is provided as a hardware interface provided on a physical machine supporting a virtualization layer. The interface comprises an indication of the state of virtualization on the physical machine to monitor any virtual machines running on the physical machine. The interface also comprises means for interacting with the virtualization layer, for example for activating a maintenance mode by a migration of virtual servers running on a physical machine.

19 Claims, 5 Drawing Sheets

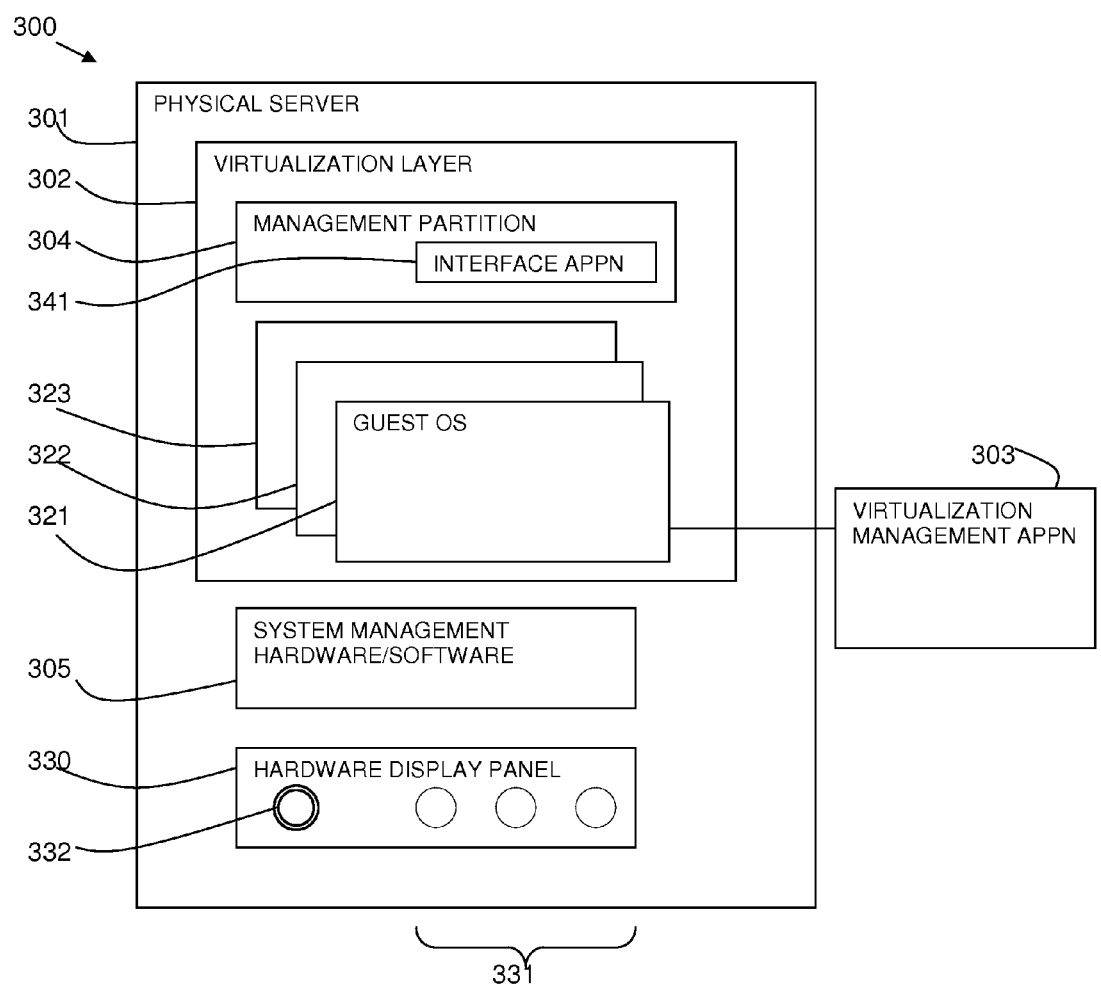

SYSTEM FOR VIRTUALISATION MONITORING

BACKGROUND OF THE INVENTION

1. Technical Field

This invention relates to the field of virtualization systems. In particular, the invention relates to virtualization monitoring and display of virtualization status on a physical machine.

2. Description of the Prior Art

Physical computing machines comprise liquid crystal display (LCD) or light-emitting diode (LED) panels to indicate hardware related status information (for example, central processing unit, memory etc). While virtualization becomes standard across all platforms there is no visual status indication for virtualization events or errors. Many users rely strongly on visual error indications.

System downtime is a serious overhead which must be minimized. There is no way for a technician to determine whether a physical system is running virtual servers by sight. Advanced administration skills are required to determine operating status of one or more virtual servers. Additionally, there is no way for a technician to interact with virtual systems locally without administration access. For example, a common requirement for virtual system interaction is to vacate physical systems of virtual workload(s).

Known virtualization systems do not have an interface between the user and the physical hardware to monitor virtual system status and interact with virtual systems. Accordingly, there is a need for an interface that supports management of one or more virtual systems.

SUMMARY OF THE INVENTION

The invention comprises a system, method, and article for resolving management of virtual serves through one or more status indicators.

In one aspect of the present invention there is provided a system for virtualization control, comprising a hardware interface provided on a physical machine to support a virtualization layer. The interface comprises an indication of the state of virtualization on the physical machine to monitor any virtual machines running on the physical machine.

In another second aspect of the present invention a method is provided for virtualization control, comprising: monitoring a virtualization layer on a physical machine; and displaying externally to the physical machine indicators of the status of any virtual machines active on the physical machine.

In yet another aspect of the present application a computer program product is provided stored on a computer readable storage medium for virtualization control, comprising computer readable program code for monitoring a virtualization layer on a physical machine; and displaying externally to the physical machine indicators of the status of any virtual machines active on the physical machine.

Other features and advantages of this invention will become apparatus from the following detailed description of the presently preferred embodiment of the invention, taken in conjunction with the accompanying drawings.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIG. 3 is a block diagram of a system in accordance with the present invention;

DESCRIPTION OF THE PREFERRED EMBODIMENT(S)

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

System virtual machines, sometimes called hardware virtual machines, allow multiplexing the underlying physical machine between different virtual machines (VMs), each running its own operating system. The software layer providing the virtualization is called a virtual machine monitor or hypervisor. A hypervisor can run on hardware (Type 1 or native VM) or on top of an operating system (Type 2 or hosted VM).

The main advantages of system VMs are: multiple OS environments can co-exist on the same computer, in strong isolation from each other; and the virtual machine can provide an instruction set architecture (ISA) that is somewhat different from that of the real machine. Multiple VMs each running their own operating system (called guest operating system) are frequently used in server consolidation, where different services that used to run on individual machines in order to avoid interference, are instead run in separate VMs on the same physical machine.

Hypervisors are classified in two types:

A Type 1 (or native or bare-metal) hypervisor is software that runs directly on a given hardware platform (as an operating system control program). A guest operating system thus runs at the second level above the hardware. Examples of native hypervisors are VMware's ESX Server (VMware is a trade mark of VMware Inc.) and VirtualIron (Virtual Iron is a trade mark of Virtual Iron Software, Inc.).

A Type 2 (or hosted) hypervisor is software that runs within an operating system environment. A "guest" operating system thus runs at the third level above the hardware. Examples comprise, VMware Server (formerly known as GSX), VMware Workstation, VMware Fusion, the open source QEMU, and Microsoft's Virtual PC (Microsoft and Virtual PC are trade marks of Microsoft Corporation).

Figure 1:
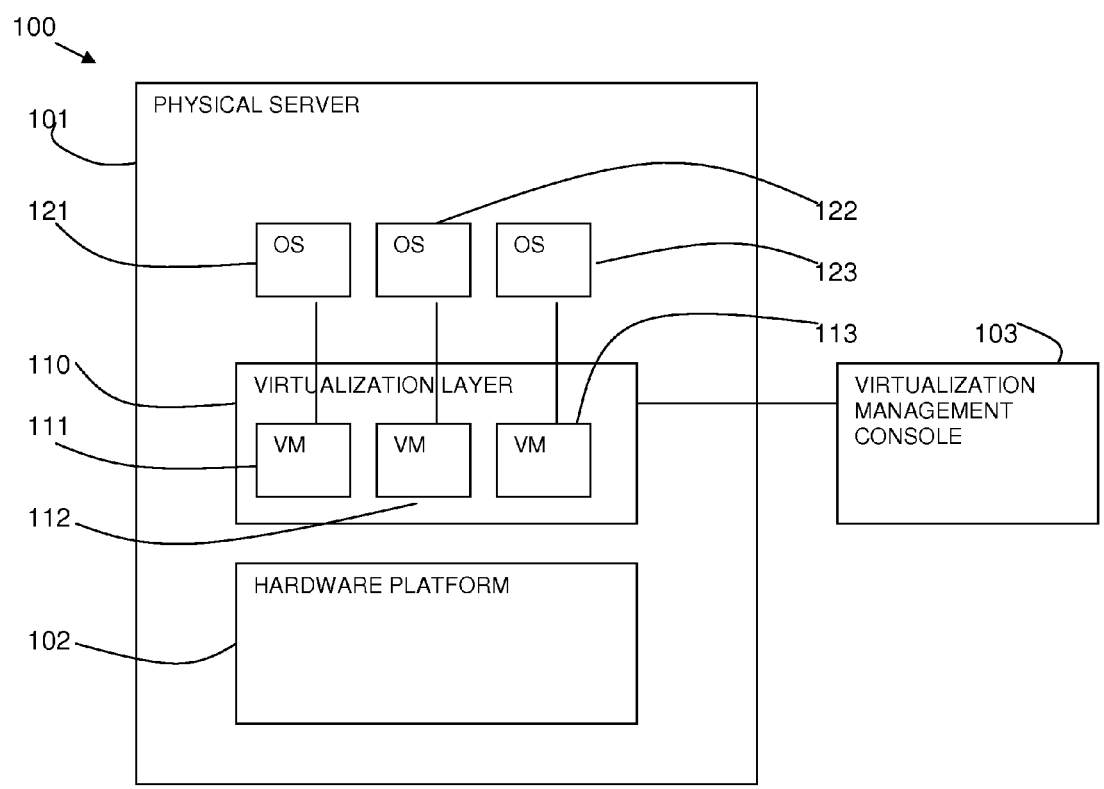
FIG. 1 is a block diagram of a computer system including virtualization as known in the prior art.

Referring to FIG. 1, a block diagram shows an example embodiment of a system (100) including native virtualization support. A physical server (101) has a hardware platform (102). A virtualization layer (110) runs on the hardware platform (102) as an operating system control program and abstracts the processor, memory, storage, and network resources into multiple virtual machines (111)-(113). Guest operating systems (121)-(123) can run on each of the virtual machines (111)-(113). A virtual management application or console (103) manages the virtualization layer (110) via web services.

Figure 2:
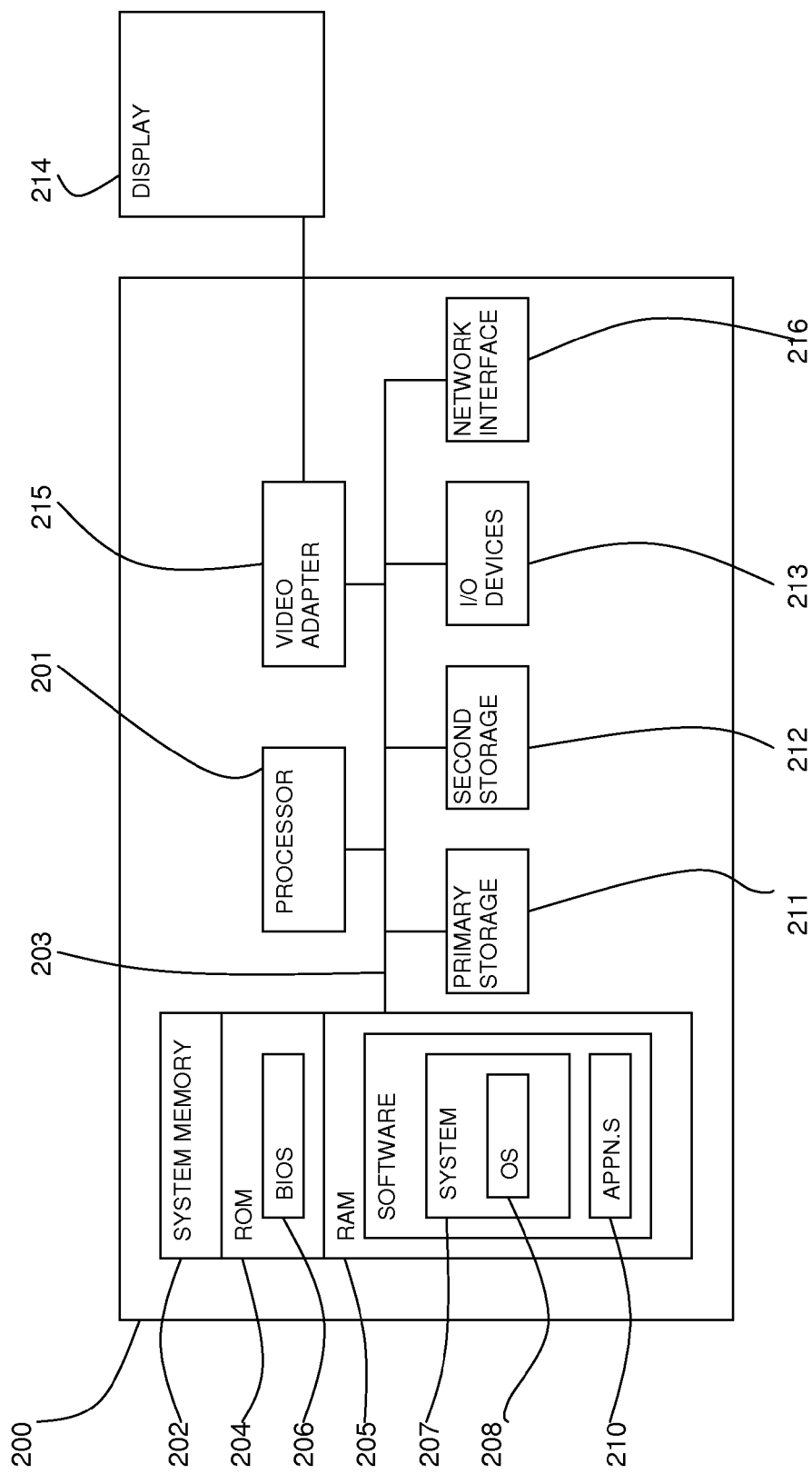
FIG. 2 is a block diagram of a computer system in which the present invention may be implemented.

Referring to FIG. 2, an exemplary computer system for implementing a physical server comprises a data processing system (200) suitable for storing and/or executing program code including at least one processor (201) coupled directly or indirectly to memory elements through a bus system (203). The memory elements can comprise local memory employed during actual execution of the program code, bulk storage, and cache memories which provide temporary storage of at least some program code in order to reduce the number of times code must be retrieved from bulk storage during execution.

The memory elements may comprise system memory (202) in the form of read only memory (ROM) (204) and random access memory (RAM) (205). A basic input/output system (BIOS) (206) may be stored in ROM (204). System software (207) may be stored in RAM (205) including operating system software (208). Software applications (210) may also be stored in RAM (205).

The system (200) may also comprise a primary storage (211), such as a magnetic hard disk drive, and secondary storage (212), such as a magnetic disc drive and an optical disc drive. The drives and their associated computer-readable media provide non-volatile storage of computer-executable instructions, data structures, program modules and other data for the system (200). Software applications may be stored on the primary and secondary storage means (211), (212) as well as the system memory (202).

The computing system (200) may operate in a networked environment using logical connections to one or more remote computers via a network interface (216).

Input/output devices (213) can be coupled to the system either directly or through intervening I/O controllers. A user may enter commands and information into the system (200) through input devices such as a keyboard, pointing device, or other input devices, including but not limited to a microphone, a joy stick, game pad, a satellite dish, a scanner, or the like. Output devices may comprise speakers, printers, etc. A display device (214) is also connected to system bus (203) via an interface, such as video adapter (215).

Referring to FIG. 3, a system (300) is shown and described providing a physical display interface (330) for displaying virtualization status and events allowing a user to monitor and interact with a virtualization layer (302) directly on a physical system (301). The physical display interface (330) may be provided external to the physical system (301), such as an external component to associate with the physical system, allowing easy access to the interface (330). In one embodiment, the interface may be an integrated panel in a physical machine. Similarly, in a further embodiment, the hardware interface may be implemented by utilising existing indicators and control means of a physical machine.

The system (300) comprises a physical server (301) with a virtualization layer (302) running multiple guest operating systems (321)-(323). The server (301) is connected to a virtualization management application (303), for example, via a network.

An interface application (341) in the form of an agent is provided residing in the management partition (304) of the virtualization layer (302). The interface application (341) interacts with a virtualization management application (303) to initiate actions and detect status changes. A virtualization layer (302) provides an application programming interface (APIs) for interaction, for example, for entering a maintenance mode, so the interface application (341) can communicate with the API of the virtualization layer (302).

The interface application (341) resides in a management partition (304) of a virtualization layer (302). For example, the management partition (304) may be Console OS for VMware, domain 0 for Xen (Xen is a trade mark of XenSource, Inc.) or Parent Partition for Microsoft Hyper-V (Hyper-V is a trade mark of Microsoft Corporation). The interface application (341) is specific to each type of virtualization layer (302).

The interface application (341) may be provided as a plug-in or extension to the management partition (304) of virtualization layer (302) which can be added to provide the means for driving the physical display interface (330) and providing a link between the host system management hardware/software (305) and the virtualization management application (303).

A physical display interface (330) or panel is provided for displaying virtualization status and events. The display interface (330) interacts with the interface application (341) via the server's (301) system management hardware or software (305).

The interface application (341) communicates and interacts with the central virtualization management application (303). For example, the virtualization management application (303) may be VMware VirtualCenter or Microsoft Systems Center Virtual Machine Manager. The interface application (341) also reacts to physical system events. In one embodiment, this may be through the systems management hardware (305) or adapter. Alternatively, in one embodiment, this may be though system management software (305), such as the IBM director agent.

The interface application (341) drives the physical display interface (330) reflecting the virtualization status. The interface application (341) sends commands to the management partition (304) of the virtualization layer (302) in order to execute virtualization related actions instigated via the display interface (330), for example, maintenance mode.

The display interface (330) comprises monitoring means (331) including display means such as light indicators and number displays, and control means (332) such as buttons for initiating interaction with the virtual environment.

As an example, in the event of a critical hardware alert, the virtualization layer (302) will automatically be put into maintenance mode through the following procedure which is displayed using the display interface (330). A systems management alert is passed to the systems management hardware or software (305), which is passed to the virtualization management application (303), which is passed to the display agent (330) via the interface application (341).

Figure 4A:
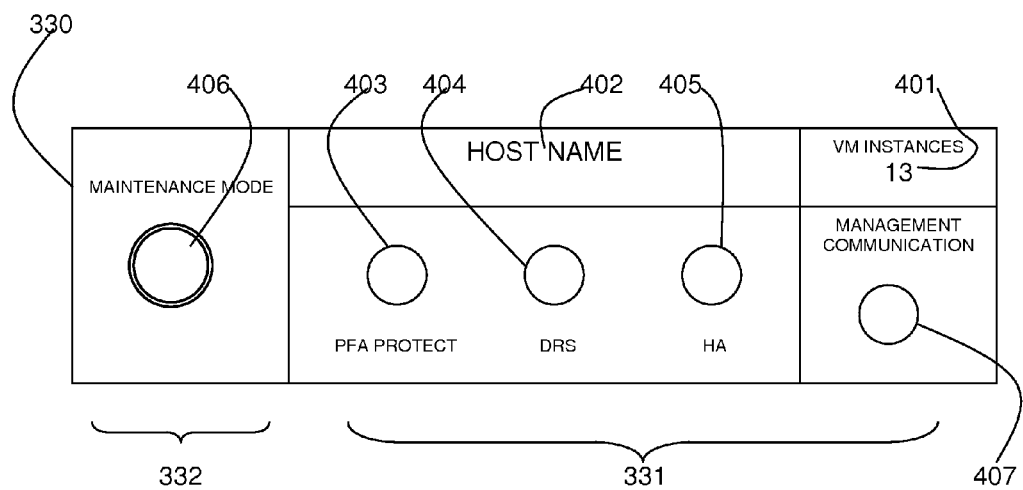
FIG. 4A is an example representation of a display interface in accordance with the present invention.

An example display interface (330) is shown in FIG. 4A. The display interface (330) comprises monitoring means (331) including a number of LEDs and alphanumeric displays indicating major virtualization related statuses and errors. For example, the monitoring means (331) comprises an indication (401) of how many (if any) virtual machines are running on the system, and indication (402) of the host name. The monitoring means (331) also comprises an indication of the status of management communication (407). The display interface (330) shown in FIG. 4A is based on a VMware server and the monitoring means (331) also comprises indications (403)-(405) of the status of the modes of predictive failure alert (PFA) protect (403), distributed resource scheduler (DRS) (404), and high availability (HA) service (405).

The display interface (330) also comprises a control means (332) which in this example is a button (406) for interaction with the virtual environment. In this example, the button (406) is a "maintenance mode" button which allows a technician to put a system into a safe maintenance mode ensuring all workload has been migrated to alternative virtualization hosts. The changing status can be indicated, for example, by an LED frame around the button 406 or a separate indicator providing an indication, such as changing from red, flashing, to green.

Figure 4B:
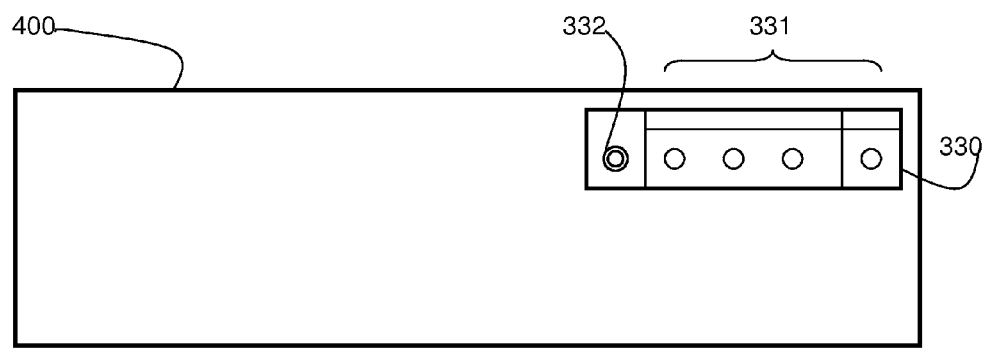
FIG. 4B is an example representation of the outside casing of a physical machine with a display interface in accordance with the present invention.

FIG. 4B shows the outside casing of a physical machine (400) with a display interface (330) with control means (332) and monitoring means (331).

The display interface (330) can be implemented in a number of different embodiments, as follows:

An integrated panel incorporated in the hardware of a physical server. This embodiment would be in the form of a physical interface (LCD, LED or full graphics display) integrated into a system. Such a panel is provided external to the physical server allowing easy viewing and access to the panel.

An add-on display panel. This embodiment may be provided as an add-on interface which plugs into a physical system; for example, through a USB port or a computer expansion card such as PCI-Express (PCI-Express is a trade mark of Intel Corporation). This embodiment may be used with different existing systems. An associated interface application could be provided as software on a removable medium which may be executed on the existing system in conjunction with the add-on display panel.

Utilising existing LEDs and buttons on physical systems. This embodiment would reduce development costs and efforts as existing physical parts could be reassigned to display virtualization related event. For example, "light path diagnostics" panel LEDs may be reassigned to virtualization events.

Figure 5:
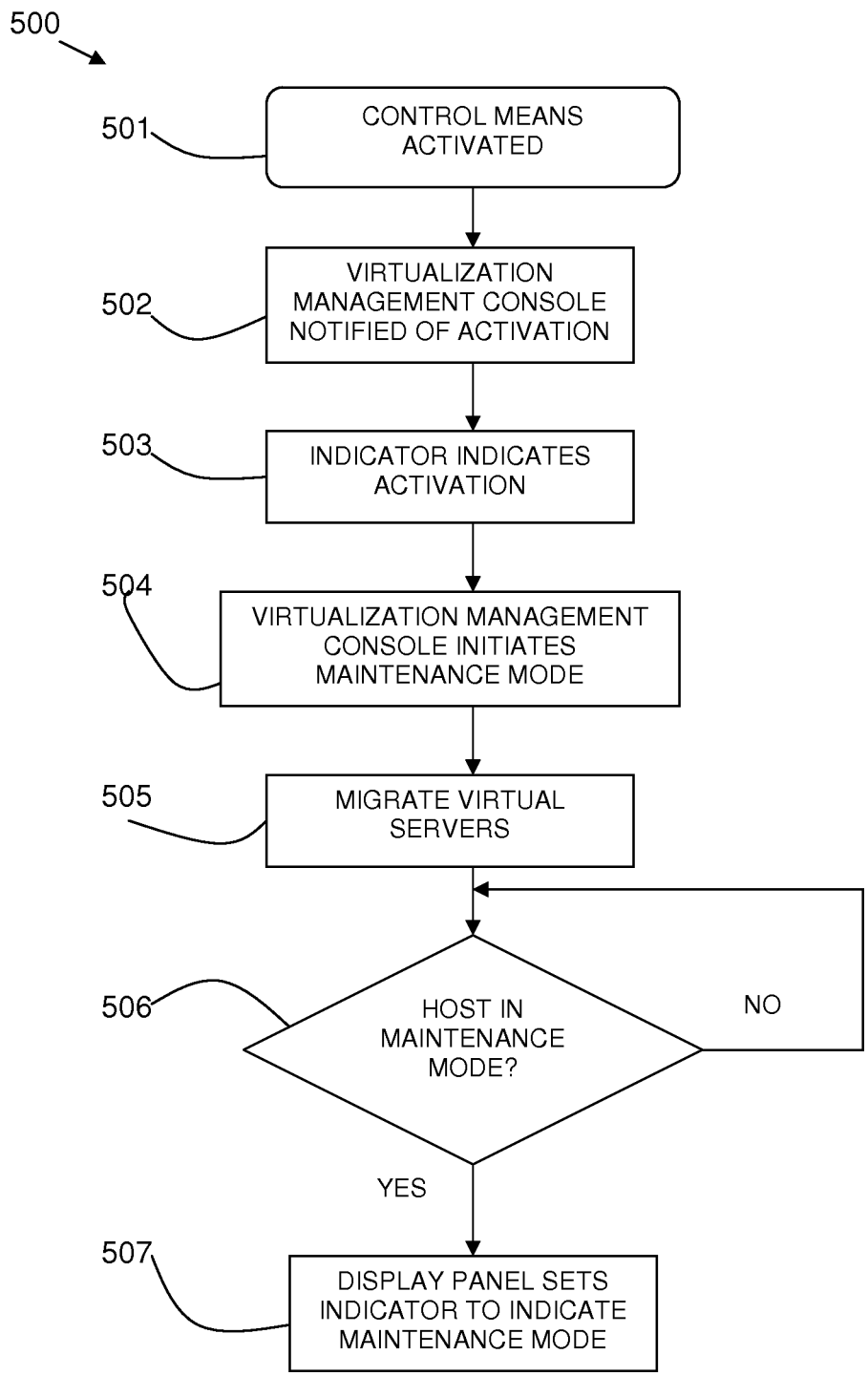
FIG. 5 is a flow diagram of a method in accordance with an aspect of the present invention.

Referring to FIG. 5, a flow diagram (500) shows an example interaction by a user with the virtualization environment using a display interface as described.

A user activates (501) a control means on the interface to activate a maintenance mode in the virtualization environment. In one embodiment, the control means may be activated by pressing a button or actuating a switch. A virtualization management console (for example, in VMware the VMware VirtualCenter, in VirtualIron, the VirtualIron Virtualization manager, etc.) is notified (502) of the activation and an indicator indicates (503) the activation (for example, by flashing red). The virtualization management console (504) initiates the maintenance mode and migrates (505) the virtual servers.

It is determined (506) if the host is in maintenance mode. If not, the determination repeats until the host is in maintenance mode. When the host is in maintenance mode, the display interface sets the indicator to a color indicating the mode (507). In one embodiment, the color green is employed on the interface as an indicator of the maintenance mode.

In one embodiment, the virtualization management console can also provide notification of an event and the display interface is changed to indicate the event.

Users like the ability to see the state of hardware from the outside casing of a server. As the use of virtualization is becoming greater an indication of the status of the virtual machines running on a server is required. Users, administrators, engineers etc. are able to determine the "virtual" status of a physical system by looking at the display interface and will also be able to interact with the virtual management system through the display interface. This interaction can be carried out without integration into the wider system's management infrastructure.

As an example of the advantage of such an external physical interface, an engineer may need to work on a physical machine which hosts multiple virtual machines. Using the external physical interface he can see the number of virtual machines running on the physical machine and can bring the system down to vacate the host by activating a maintenance mode via the physical interface. Once the physical interface indicates that the host is in maintenance mode and all the virtual machines have been vacated, the engineer can carry out the required work or maintenance.

The invention can take the form of an entirely hardware embodiment, an entirely software embodiment, or an embodiment containing both hardware and software elements. In an embodiment, the invention is implemented in software, which comprises but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain; or store, the program for use by or in connection with the instruction execution system, apparatus or device.

The medium can be an electronic, magnetic, optical, or semiconductor system (or apparatus or device). Examples of a computer-readable medium comprise a semiconductor or solid state memory, magnetic tape, a removable computer diskette, a random access memory (RAM), a read only memory (ROM), a rigid magnetic disk and an optical disk. Current examples of optical disks comprise compact disk read only memory (CD-ROM), compact disk read/write (CD-R/W), and DVD.

It will be appreciated that, although specific embodiments of the invention have been described herein for purposes of illustration, various modifications may be made without departing form the spirit and scope of the invention. In particular, the interface may include means for interacting with the virtualization layer, including but not limited to means for activating a maintenance mode by migrating the virtual servers running on a physical machine. Additionally, the method may employ an interface application provided in the virtualization layer for communication with a virtualization management application and for driving the hardware interface. Interfacing with a virtualization management application may include monitoring a virtual machine and/or interacting with a virtual machine. Accordingly, the scope of protection of this invention is limited only by the following claims and their equivalents.

The invention claimed is:

1. A system for virtualization monitoring, comprising:
multiple virtual machines running on a physical machine;
an interface application residing in a virtualization layer of the physical machine to monitor a status of one or more of the virtual machines;
a display panel associated with the interface application and provided in communication with the physical machine to support interaction with the virtualization layer, wherein the display panel presents information provided by the interface application, including presenting a list of active virtual machines running on the physical machine and host names associated with each of the virtual machines; and
wherein the display panel supports an interaction with the virtualization layer including migrating at least one of the active virtual machines between virtualization hosts, and further including using the interface application to send commands to a management partition of the virtualization layer, the commands to execute a virtualization related action consisting of virtual machine management.

2. The system as claimed in claim 1, wherein the display panel supports an interaction with the virtualization layer.

3. The system as claimed in claim 2, wherein the display panel supports activation of a maintenance mode by migrating any virtual servers running on the physical machine.

4. The system as claimed in claim 1, further comprising the interface application provided in the virtualization layer for communication with a virtualization management application and commanding the hardware interface.

5. The system as claimed in claim 4, wherein the interface application in communication with the virtualization management application comprises monitoring a virtual machine.

6. The system as claimed in claim 4, wherein the interface application in communication with the virtualization management application supports interaction with a virtual machine.

7. The system as claimed in claim 1, wherein the display panel is an integrated panel in a physical machine.

8. The system as claimed in claim 1, wherein the display panel is implemented as an external component to associate with a physical machine.

9. The system as claimed in claim 1, wherein the display panel is implemented by utilizing an existing indicator and control means of a physical machine.

10. The system as claimed in claim 1, wherein the display panel is provided external to the physical machine.

11. A method for virtualization monitoring, comprising:
providing multiple virtual machines running on a physical machine;
providing an interface application residing in a virtualization layer of the physical machine;
monitoring a status of the virtual machines within the virtualization layer on a physical machine through the interface application; and
displaying through a display panel associated with the interface application, externally to the physical machine a list of active virtual machines running on the physical machine and host names associated with the active virtual machines;
wherein the display panel supporting an interaction with the virtualization layer including migrating at least one of the active virtual machines between virtualization hosts, and further including using the interface application to send commands to a management partition of the virtualization layer.

12. The method as claimed in claim 11, further comprising interacting with the virtualization layer via the display panel provided on the physical machine.

13. The method as claimed in claim 12, wherein interacting comprises activating a maintenance mode by migrating any virtual server running on the physical machine.

14. The method as claimed in claim 11, further comprising communicating with a virtualization management application.

15. An article comprising:
a computer readable non-transitory storage medium including computer program instructions loadable into the internal memory of a digital computer, comprising instructions for virtualization monitoring, the instructions comprising:
instructions to create multiple virtual machines running on a physical machine;
instructions to run an interface application residing in a virtualization layer of said physical machine;
instructions for said interface application to monitor a status of the virtual machines on the physical machine within the virtualization layer; and
instructions for a display panel associated with the interface application to display externally to the physical machine a list of active virtual machines running on the physical machine and host names associated with the active virtual machines;
wherein the display panel supporting an interaction between a user and the virtualization layer including migrating at least one of the active virtual machines between virtualization hosts and further including using the interface application to send commands to a management partition of the virtualization layer.

16. The article as claimed in claim 15, further comprising instructions to interact with the virtualization layer via the display panel provided on the physical machine.

17. The article as claimed in claim 16, wherein the instructions to interact with the virtualization layer includes activating a maintenance mode by migrating any virtual servers running on the physical machine.

18. The article as claimed in claim 15, further comprising instructions to communicate with a virtualization management application.

19. The system of claim 1, wherein virtual machine management includes changing an operating status of at least one of the virtual machines, the operating mode selected from the group consisting of: maintenance mode, availability mode, and safe maintenance mode.

* * * * *